(12) United States Patent
Sarkar et al.

(10) Patent No.: US 8,241,771 B2
(45) Date of Patent: *Aug. 14, 2012

(54) COMPACT SOLID OXIDE FUEL CELL STACK

(75) Inventors: Partho Sarkar, Edmonton (CA); Lorne Johanson, Edmonton (CA); Hongsang Rho, Edmonton (CA)

(73) Assignee: Alberta Innovates-Technology Futures, Edmonton, Alberta (CA)

( * ) Notice: Subject to any disclaimer, the term of this patent is extended or adjusted under 35 U.S.C. 154(b) by 1833 days.

This patent is subject to a terminal disclaimer.

(21) Appl. No.: 10/539,831

(22) PCT Filed: Dec. 17, 2003

(86) PCT No.: PCT/CA03/01992
§ 371 (c)(1),
(2), (4) Date: Feb. 28, 2006

(87) PCT Pub. No.: WO2004/055933
PCT Pub. Date: Jul. 1, 2004

(65) Prior Publication Data
US 2006/0134489 A1    Jun. 22, 2006

(30) Foreign Application Priority Data
Dec. 17, 2002    (CA) .................................... 2414622

(51) Int. Cl.
*H01M 8/12* (2006.01)
(52) U.S. Cl. .......................... 429/34; 429/535; 429/488
(58) Field of Classification Search .................. None
See application file for complete search history.

(56) References Cited

U.S. PATENT DOCUMENTS

| | | | | |
|---|---|---|---|---|
| 5,518,829 A * | 5/1996 | Satake et al. | | 429/30 |
| 5,712,055 A * | 1/1998 | Khandkar et al. | | 429/31 |
| 6,458,477 B1 * | 10/2002 | Hsu | | 429/440 |
| 7,067,215 B2 * | 6/2006 | Lazaroff et al. | | 429/38 |
| 7,452,622 B2 * | 11/2008 | Sarkar et al. | | 429/466 |
| 2002/0048701 A1 * | 4/2002 | Ukai et al. | | 429/40 |
| 2002/0177026 A1 * | 11/2002 | Hatano et al. | | 429/32 |
| 2002/0182468 A1 * | 12/2002 | Janousek et al. | | 429/30 |
| 2003/0134171 A1 * | 7/2003 | Sarkar et al. | | 429/31 |
| 2003/0224232 A1 * | 12/2003 | Browall et al. | | 429/30 |
| 2004/0072054 A1 * | 4/2004 | Cochran et al. | | 429/38 |
| 2004/0258972 A1 * | 12/2004 | Du et al. | | 429/31 |

FOREIGN PATENT DOCUMENTS

| | | | |
|---|---|---|---|
| CA | 2459574 | | 5/2002 |
| EP | 0 320 087 A | | 6/1989 |
| JP | 02-075167 | | 3/1990 |
| JP | 02/075167 | * | 3/1990 |
| JP | 08-050914 | | 2/1996 |

(Continued)

*Primary Examiner* — Ula C. Ruddock
*Assistant Examiner* — Alix Echelmeyer
(74) *Attorney, Agent, or Firm* — The Noblitt Group, PLLC

(57) ABSTRACT

This invention relates to a solid oxide fuel cell stack comprising a plurality of tubular solid oxide fuel cells each comprising concentric inner and outer electrode layers sandwiching a concentric electrolyte layer. The fuel cells extend in the same direction and are arranged in a cluster with at least one fuel cell having an electrolyte layer with a different composition and different maximum operating temperature than another fuel cell in the cluster. The fuel cell having the electrolyte layer with a higher maximum operating temperature is located closer to the core of the cluster than the fuel cell having the electrolyte layer with a lower maximum operating temperature.

8 Claims, 12 Drawing Sheets

FOREIGN PATENT DOCUMENTS

| WO | WO 01/71841 A | 9/2001 |
| WO | WO 01/86030 A | 11/2001 |
| WO | WO 03/062503 | 7/2003 |
| WO | WO 03/001624 A | 1/2004 |

* cited by examiner

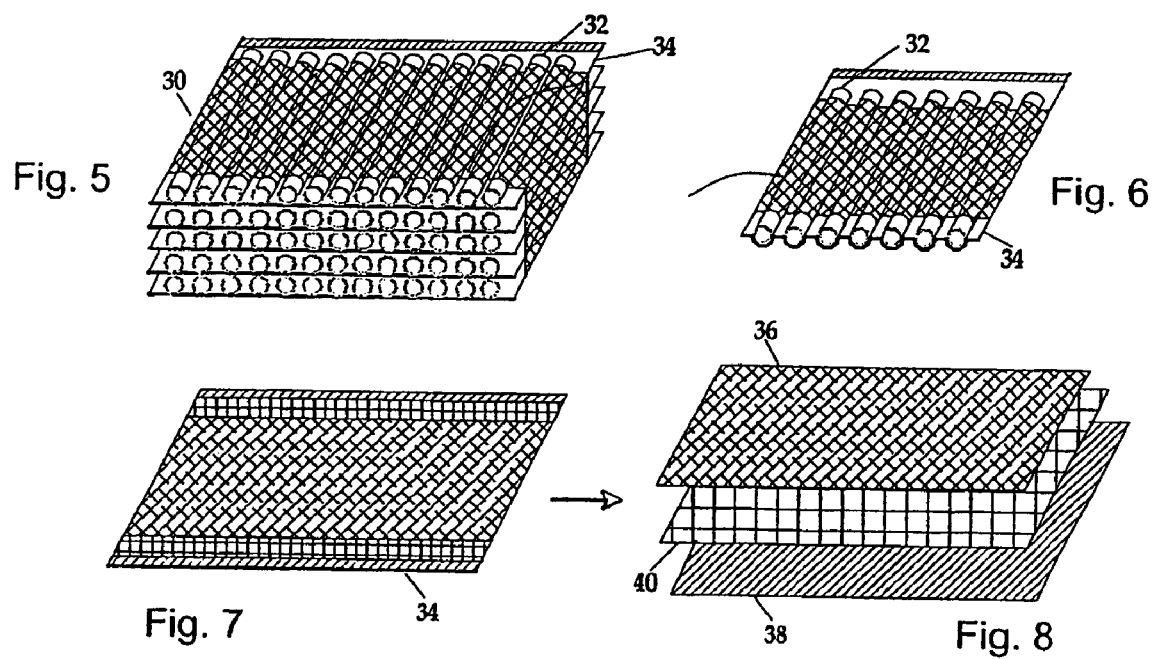

Fig. 11(a)
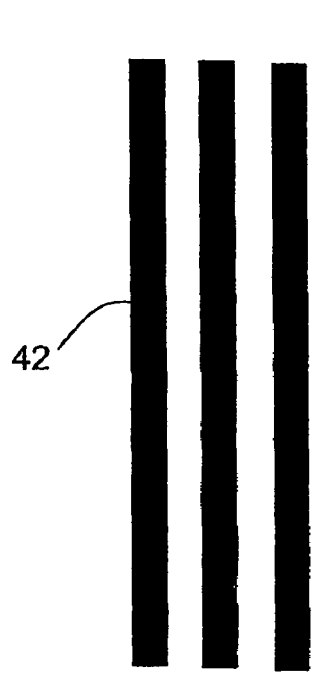
42
42
Fig. 11(b)
Fig. 12(a)
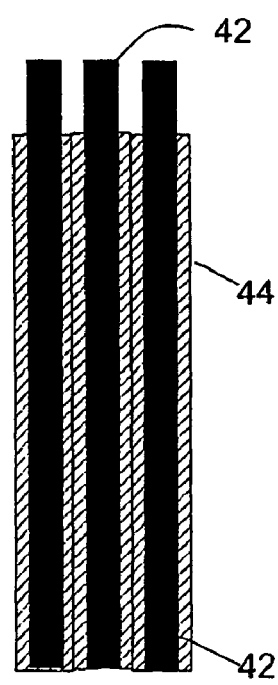
42
44
42
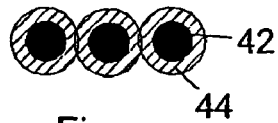
42
44
Fig. 12(b)
Fig. 13(a)
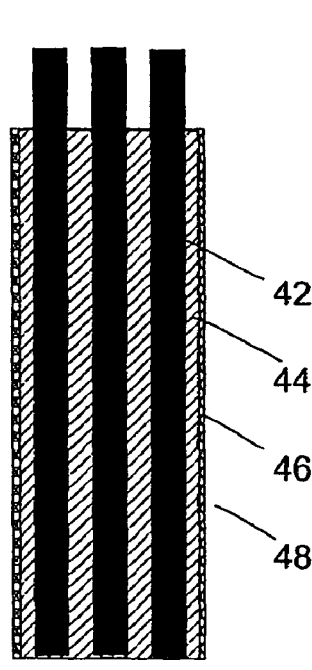
42
44
46
48
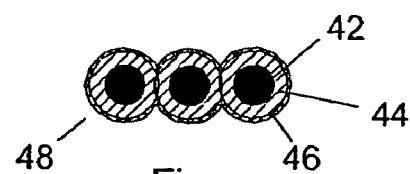
42
44
46
48
Fig. 13(b)

Fig. 14(a)
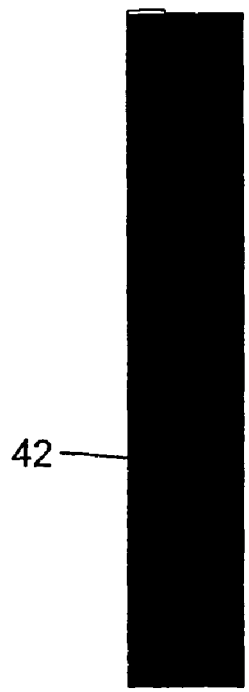
42
Fig. 15(a)
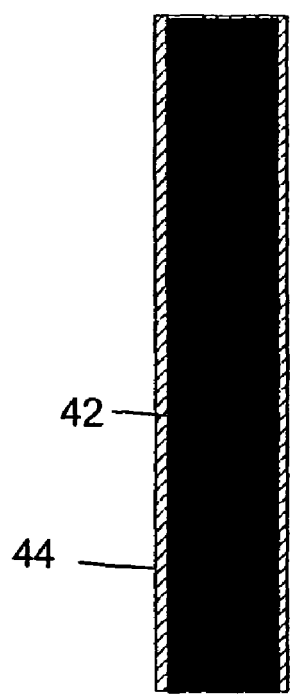
42
44
Fig. 16(a)
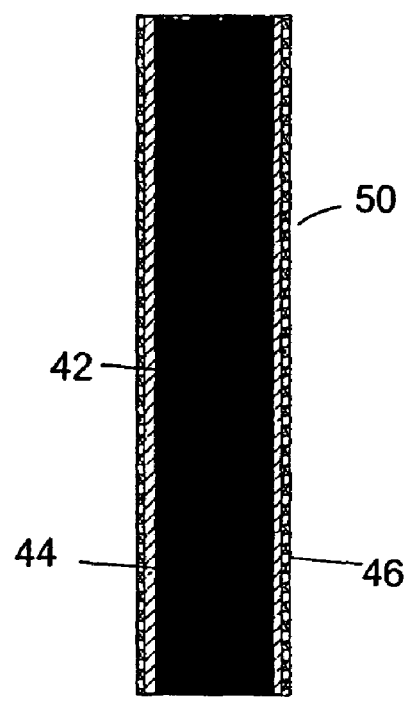
50
42
44 — 46
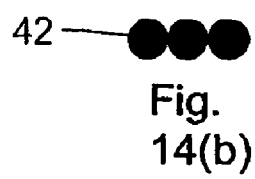
42
Fig. 14(b)
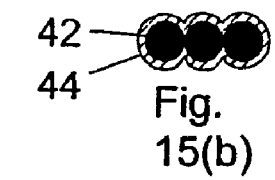
42
44
Fig. 15(b)
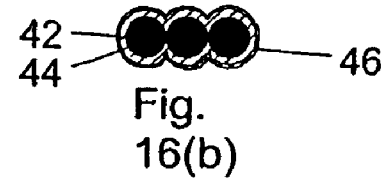
42
44 — 46
Fig. 16(b)
200
Fig. 17

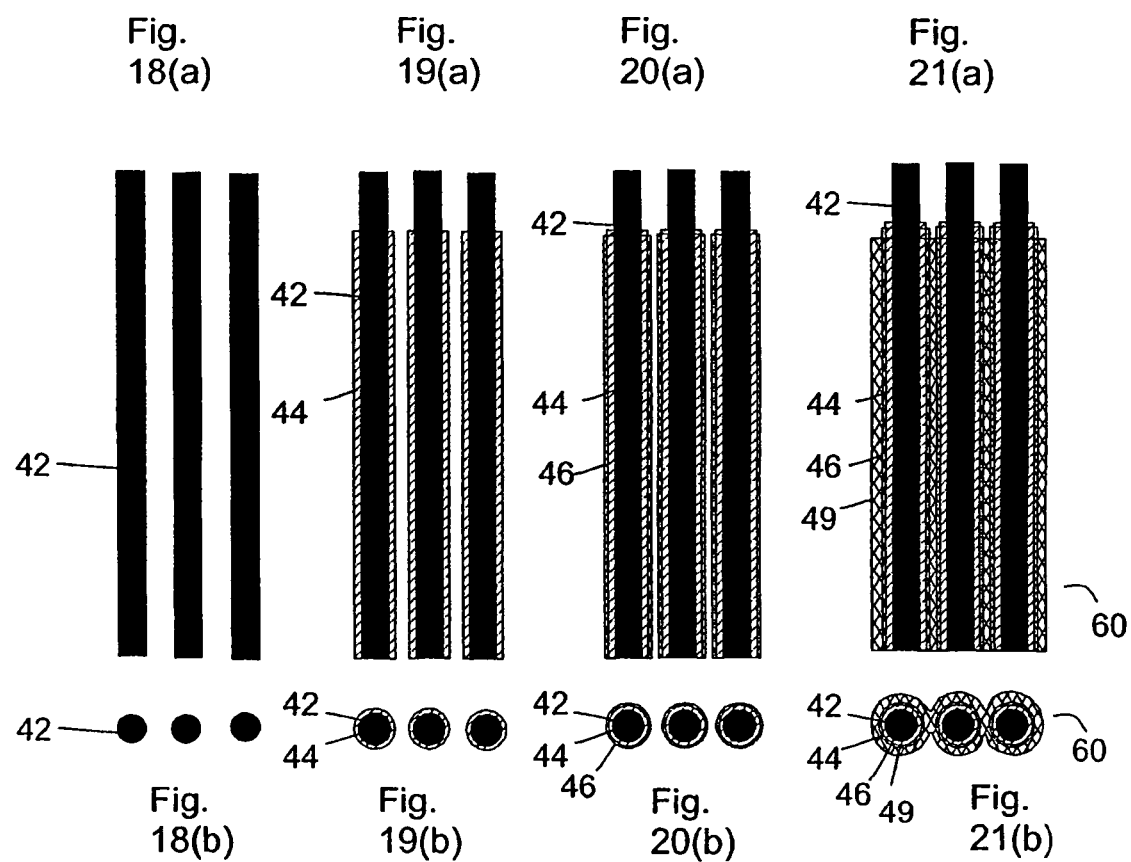

COMPACT SOLID OXIDE FUEL CELL STACK

FIELD OF THE INVENTION

This invention relates generally to solid oxide fuel cells, and in particular, to a compact solid oxide fuel cell stack.

BACKGROUND OF THE INVENTION

It is well known to deposit coatings of material on a conductive core by electrophoretic deposition (EPD). EPD is a combination of electrophoresis and deposition. Electrophoresis is the movement of charged particles in an electric field. Deposition is the coagulation of particles into a mass. Applicant's own PCT application no. PCT/CA01/00634 relates generally to the production of hollow ceramic membranes by EPD, and in particular to the production of hollow, tubular ceramic electrodes by EPD for solid oxide fuel cells (SOFC).

In general, a SOFC comprises two electrodes (anode and cathode) separated by a ceramic, solid-phase electrolyte. To achieve adequate ionic conductivity in such a ceramic electrolyte, the SOFC operates at an elevated temperature, typically in the order of about 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

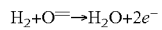

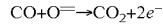

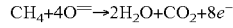

Cathode reaction:

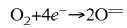

Known SOFC designs include planar and tubular fuel cells. Current SOFC fuel cell stack designs typically stack the fuel cells side-by-side. For example, a tubular stack design as published by Siemens Westinghouse Power Generation features tubular fuel cells arranged in a side-by-side rectangular array. The large size of the Siemens Westinghouse fuel cells (typically >5 mm diameter) and the relatively low power density (power output per unit volume) of the stack design makes such a fuel cell stack impractical for small scale applications such as portable electronic devices.

It is therefore desirable to provide a compact SOFC stack design that, in particular, can be made small enough with sufficient energy density for small scale applications.

SUMMARY OF THE INVENTION

According to one aspect of the invention, there is provided a solid oxide fuel cell stack comprising a plurality of tubular solid oxide fuel cells each comprising concentric inner and outer electrode layers sandwiching a concentric electrolyte layer. The fuel cells extend in substantially the same direction and are arranged in a cluster with at least one fuel cell having an electrolyte layer with a different composition and different maximum operating temperature than another fuel cell in the cluster. The fuel cell having the electrolyte layer with a higher maximum operating temperature is located closer to the core of the cluster than the fuel cell having the electrolyte layer with a lower maximum operating temperature.

The solid oxide fuel cell stack can be a cluster of at least three tubular fuel cells in which there is
 (a) an inner tubular solid oxide fuel cell having an electrolyte layer with a suitable composition to operate at or below a first maximum operating temperature;
 (b) a middle tubular solid oxide fuel cell inside which the inner fuel cell is located, and having an electrolyte layer with a suitable composition to operate at or below a second maximum operating temperature that is lower than the first maximum operating temperature; and
 (c) an outer tubular solid oxide fuel cell inside which the inner and middle fuel cells are located, and having an electrolyte layer with a suitable composition to operate at or below a third maximum operating temperature that is lower than the first maximum operating temperature.

The inner electrode of the inner fuel cell, outer electrode of the middle fuel cell, and the inner electrode of the outer fuel cell are one of an anode and cathode, and the outer electrode of the first inner fuel cell, the inner electrode of the middle fuel cell, and the outer electrode of the outer fuel cell are the other of the anode and cathode.

The inner fuel cell can have a $Y_2O_3$-doped $ZrO_2$ electrolyte, the middle fuel cell can have a $Sc_2O_3$-doped $ZrO_2$ electrolyte, and the outer fuel cell can have a doped-$CeO_2$ based electrolyte. In particular, the doped-$CeO_2$ based electrolyte can be gadolinium cerium oxide.

Alternatively, the solid oxide fuel cell stack can be a cluster of at least two fuel cells in which there is
 (a) a first inner tubular solid oxide fuel cell having an electrolyte layer with a suitable composition to operate at or below a first maximum operating temperature, and
 (b) a first outer tubular solid oxide fuel cell inside which the first inner fuel cell is located, and having an electrolyte layer with a suitable composition to operate at or below a second maximum operating temperature that is lower than the first maximum operating temperature.

The inner electrode of the first inner fuel cell and outer electrode of the first outer fuel cell are one of an anode and cathode, and the outer electrode of the first inner fuel cell and the inner electrode of the first outer fuel cell are the other of the anode and cathode.

The outer fuel cell can have an electrolyte composition selected from the group consisting of doped-$CeO_2$ based and $Sc_2O_3$-doped $ZrO_2$ type electrolytes. In particular, the doped-$CeO_2$ based electrolyte can be gadolinium cerium oxide. The first inner fuel cell can have a $Y_2O_3$-doped $ZrO_2$ electrolyte.

The fuel cell stack can also have a second inner tubular solid oxide fuel cell that comprises concentric inner and outer electrode layers sandwiching a concentric electrolyte layer, and is located inside the first inner fuel cell. The inner electrode layer of the second inner fuel cell is the same electrode type (anode or cathode) as the outer electrode layer of the first inner fuel cell, and outer electrode layer of the second inner fuel cell is the same electrode type as the inner electrode layer of the first inner fuel cell.

The electrolyte layer of the second inner fuel cell can be the same composition as the electrolyte layer of the first inner fuel cell. The first and second inner fuel cells can have a $Y_2O_3$- doped $ZrO_2$ electrolyte, and the outer fuel cell can have an electrolyte composition selected from the group consisting of doped-$CeO_2$ based and $Sc_2O_3$-doped $ZrO_2$ type electrolytes. In particular, the doped-$CeO_2$ based electrolyte can be gadolinium cerium oxide.

The fuel cell stack can also have a second outer tubular solid oxide fuel cell that comprises concentric inner and outer electrode layers sandwiching a concentric electrolyte layer. The second outer SOFC can be located outside the first outer fuel cell. The inner electrode layer of the second outer fuel cell can be the same electrode type (anode or cathode) as the outer electrode layer of the first outer fuel cell, and outer electrode layer of the second outer fuel cell can be the same electrode type as the inner electrode layer of the first outer fuel cell. The electrolyte layer of the second outer fuel cell can have the same composition as the electrolyte layer of the first outer fuel cell. Furthermore, the first inner fuel cell can have a $Y_2O_3$-doped $ZrO_2$ electrolyte, and the first and second outer fuel cells can have an electrolyte composition selected from the group consisting of doped-$CeO_2$ based and $Sc_2O_3$-doped $ZrO_2$ type electrolytes. In particular, the doped-$CeO_2$ based electrolyte can be gadolinium cerium oxide.

The first inner fuel cell can have a $Y_2O_3$-doped $ZrO_2$ electrolyte, the first outer fuel cell can have an $Sc_2O_3$-doped $ZrO_2$ doped-$CeO_2$ based electrolyte, and the second outer fuel cell can have a doped-$CeO_2$ $Sc_2O_3$-doped $ZrO2$ based electrolyte.

According to another embodiment of the invention, there is provided a solid oxide fuel cell stack comprising an electrically conductive support plate; and, a plurality of tubular solid oxide fuel cell sub-stacks arranged side-by-side on the support plate. Each fuel cell sub-stack comprises at least one fuel cell having concentric inner and outer electrode layers sandwiching a concentric electrolyte layer. In particular, the sub-stack can comprise a plurality of concentrically arranged fuel cells as described above.

The support plate can comprises a porous metal foam matrix sheet with an optional metal backing sheet overlaid with and attached to the foam matrix sheet. The backing sheet can be perforated. Optionally, the support plate can be corrugated and each fuel cell sub-stack can be located within a corrugation. Or, the support plate can comprise an electrically conductive metal support layer, and an oxidation-resistant layer coated on the metal support layer. Additionally, the support layer can comprise a metal support layer and a current conducting cathode layer coated on the support layer.

According to another aspect of the invention, there is provided a method of manufacturing a solid oxide fuel cell comprising:
(a) arranging a plurality of longitudinally-extending combustible cores side-by-side in a cluster;
(b) electrophoretically depositing enough inner electrode material onto the cores that the outer periphery of the cluster is covered with electrode material thereby forming a continuous inner electrode layer around the cluster;
(c) depositing electrolyte material onto the inner electrode layer to form an electrolyte layer;
(d) sintering the layers such that the combustible cores combust and at least one reactant channel is formed inside the inner electrode layer; and
(e) applying an outer electrode layer onto the electrolyte layer.

At least two of the cores can be arranged in side-by-side contact, such that after sintering, the two contacting cores combust and a transversely elongated reactant channel is formed. Alternatively, at least two of the core can be arranged side-by-side in a spaced arrangement, such that inner electrode material is deposited between the spaced cores and after sintering, the two spaced cores combust and two spaced inner reactant channels are formed. In either case, the cores can be arranged side-by-side in a single row.

The outer electrode layer can be deposited by electophoretic deposition, and before the sintering step.

After the inner electrode material has been deposited onto the cores and before sintering, the cores can be moved closer together until the inner electrode material on one core contacts the inner electrode material on at least one other core.

According to another aspect of the invention, there is provided a method of manufacturing a solid oxide fuel cell stack comprising:
(a) arranging a plurality of longitudinally-extending combustible cores side-by-side in a transversely spaced cluster;
(b) forming a plurality of fuel cells by electrophoretically depositing inner electrode material onto each core to form an inner electrode layer, then depositing an electrolyte material onto each core to form an electrolyte layer, and applying sufficient outer electrode material onto each electrolyte layer that the outer electrode layer of each fuel cell is physically coupled to an electrode layer of an adjacent fuel cell,
(c) sintering the layers such that the combustible cores combust, thereby forming an inner reactant channel for each fuel cell.

BRIEF DESCRIPTION OF DRAWINGS

FIG. 5 is a schematic perspective view of a fuel cell stack comprising rows of tubular fuel cells interspersed with planar support plates.

FIG. 6 is a schematic perspective view of a fuel cell stack comprising a row of tubular fuel cells supported on a corrugated support plate.

FIG. 7 is a schematic perspective view of a planar support plate in assembled form.

FIG. 8 is a schematic perspective view of the support plate in FIG. 7 in exploded form.

FIGS. 11 to 13 show steps in the production of a tubular solid oxide fuel cell having a plurality of inner reactant chambers, in which FIGS. 11(a) and (b) are respective side and top views of assembling a plurality of combustible cores; FIGS. 12(a) and (b) are respective side and top views of depositing a first electrode layer on the cores; and FIGS. 13(a) and (b) are respective side and top views of depositing an electrolyte layer on the first electrode layer.

FIGS. 14 to 17 show various stages in the production of a tubular solid oxide fuel cell having a transversely elongated inner reactant chamber, in which FIGS. 14(a) and (b) are respective side and top views of assembling combustible cores; FIGS. 15(*a*) and (*b*) are respective side and top views of depositing a first electrode layer on the cores; FIGS. 16(*a*) and (*b*) are respective side and top views of depositing an electrolyte layer on the first electrode layer; and FIG. 17 is a top view of the fuel cell after sintering.

FIGS. 18 to 21 show various stages in the production of a fuel cell stack of tubular fuel cells having a plurality of coupled outer electrode layers, in which FIGS. 18(*a*) and (*b*) are respective side and top views of assembling combustible cores; FIGS. 19(*a*) and (*b*) are respective side and top views of depositing an inner electrode layer on the cores; FIGS. 20(*a*) and (*b*) are respective side and top views of depositing an electrolyte layer on each of the inner electrode layers, and FIGS. 21(*a*) and (*b*) are respective side and top views of depositing an outer electrode layer on each of the electrolyte layers.

DETAILED DESCRIPTION OF EMBODIMENTS OF THE INVENTION

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), suicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron, titanate), ceramic super conductors, zeolites, and ceramic solid ionic conductors (such as yittria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

Figure 1A:
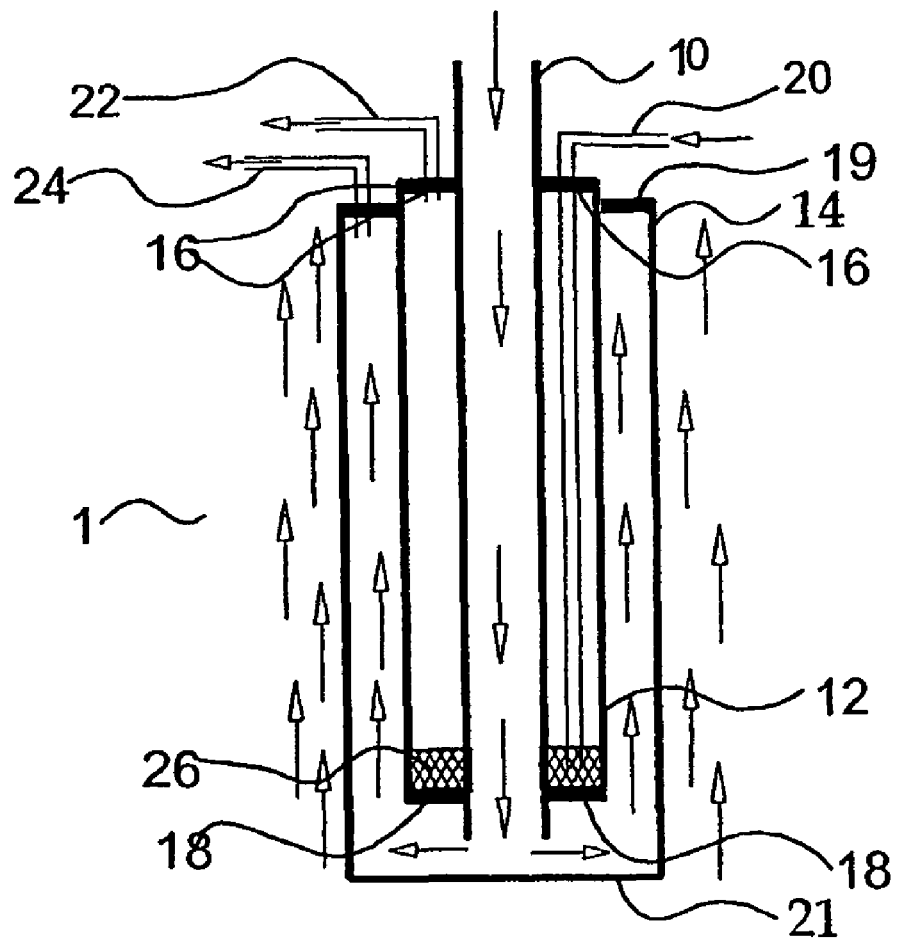
FIGS. 1(a) and (b) are schematic sectioned side and top views of a solid oxide fuel cell stack comprising three concentric tubular fuel cells.
Figure 1B:
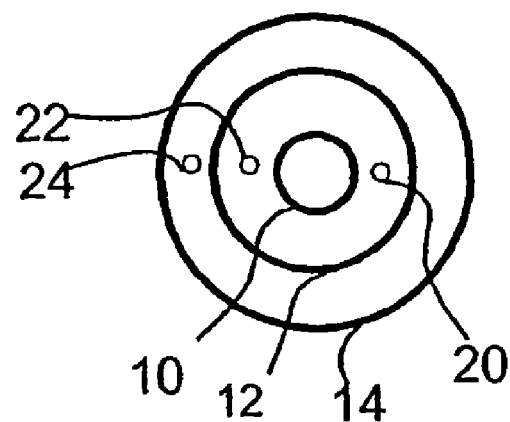

Referring to FIG. 1 and according to a first embodiment of the invention, a fuel cell stack 1 is made of three interconnected concentric tubular solid oxide fuel cells (SOFC), namely an inner fuel cell 10, a middle fuel cell 12, and an outer fuel cell 14. Each fuel cell 10, 12, 14 is a hollow tubular ceramic structure and comprises concentric layers that serve as the anode, electrolyte, and cathode. Such fuel cells 10, 12, 14 can be of a micro-tubular type as taught in Applicant's PCT applications PCT/CA01/00634 and PCT/CA03/00059. Using such micro-tubular fuel cells, the stack 1 can be particularly suitable for small-scale portable applications that generate ≦1 kW. The first PCT application teaches the production of a micro-tubular SOFC by electrophoretic deposition (EPD) and the second PCT application teaches the production of same by metal electrodeposition (MED) and composite electrodeposition (CED). Tubular fuel cells produced by such techniques can have diameters as small as about 10 μm, and various cross-sectional geometries, such as circular, square, rectangular, triangular, and polygonal. Although this description primarily describes a fuel cell stack design using micro-sized tubular fuel cells with a circular cross-section, it is within the scope of the invention to use larger diameter fuel cell tubes and/or tubes with non-circular cross-sectional geometries.

In stack 1, each of the inner and outer fuel cells 10, 14 are formed so that the inner layer of each tube is the anode, and the outer layer is the cathode. The middle fuel cell 12 is formed so that the inner layer is the cathode, and the outer layer is the anode. The anode for each fuel cell 10, 12, 14 can be made of a cermet material such as $Ni/ZrO_2$. The cathode for each of the fuel cells 10, 12, 14 can be made from magnesium doped lanthanum manganate ($LaMnO_3$), or a strontium doped lanthanum manganate (also known as lanthanum strontium manganate (LSM)) or a mixture of electrolyte and LSM or magnesium doped lanthanum manganate.

The electrolyte material for each fuel cell 10, 12, 14 is selected to correspond to the expected operating temperature of the particular fuel cell 10, 12, 14. For a particular thickness, different electrolyte materials perform optimally at different temperature ranges. For example, Yttria-Stabilized Zirconia (YSZ) electrolyte with a thickness ≦10 μm has an optimal operating temperature range ≦800° C. Gadolinium-doped Ceria (CGO) has higher electrical conductivity than zirconia based electrolyte and it shows considerable electronic conductivity above ~700° C. (with increasing electronic conductivity, the efficiency of the fuel cell goes down), therefore, its optimum operating temperature range lies between 500° and 700° C. depending on the electrolyte thickness and overall stack electrical resistance.

In operation, the fuel cell stack 1 will radiate heat radially outwards, and thus, a radial temperature gradient will exist within the stack 1, with the core being warmer than the periphery, and the inner fuel cell 10 warmer than the outer fuel cell 14. Thus, the electrolyte materials for each of the fuel cells 10, 12, 14 are selected to perform optimally within this temperature gradient. Suitable electrolyte materials for SOFC operation include Doped-$CeO_2$; $Sc_2O_3$-doped $ZrO_2$ (SSZ); and $Y_2O_3$-doped $ZrO_2$ (YSZ). Doped-$CeO_2$ electrolytes such as Gadolinium-doped Ceria (otherwise known as "Gadolinium Cerium Oxide" (CGO)) have a higher electrical conductivity than SSZ electrolytes, and thus have a lower operating temperature range. SSZ electrolytes have a higher electrical conductivity than YSZ electrolytes and thus have a lower operating temperature range. Therefore, the inner fuel cell 10 can have a YSZ electrolyte, the middle fuel cell can have a SSZ electrolyte, and the outer fuel cell can have a doped $CeO_2$ electrolyte.

Other suitable combinations of electrolyte materials can be selected for the stack 1. The following table illustrates some suitable combinations:

TABLE 1

| | Electrolyte Composition | | |
|---|---|---|---|
| | Inner Fuel Cell 10 | Middle Fuel Cell 12 | Outer Fuel Cell 14 |
| 1 | YSZ | SSZ | Doped $CeO_2$ |
| 2 | YSZ | SSZ | SSZ |
| 3 | YSZ | YSZ | SSZ |
| 4 | YSZ | YSZ | Doped $CeO_2$ |
| 5 | YSZ | Doped $CeO_2$ | Doped $CeO_2$ |

A suitable electrolyte combination can be selected from the above table based on the radial temperature gradient of the stack during operation; this radial temperature gradient can be manipulated by manipulating the design of an outer insulation layer (not shown) for the stack 1.

Figure 25A:
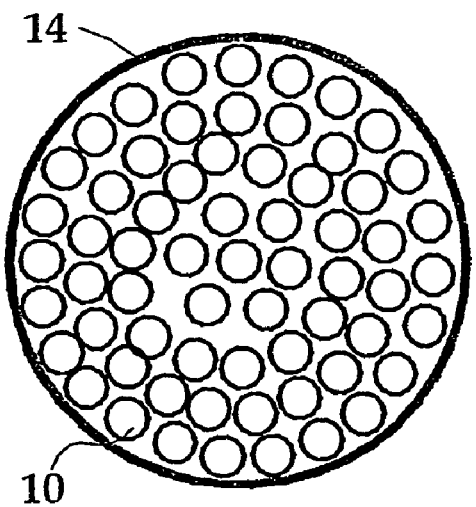
FIGS. 25(*a*) to (*d*) are schematic top views of fuel cell stacks having fuel cells with different electrolyte materials.
Figure 25B:
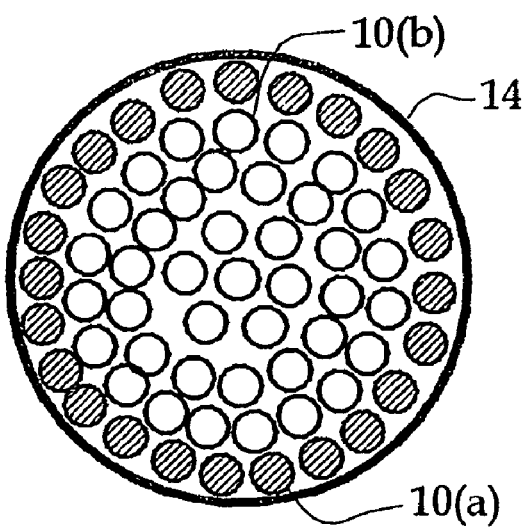
Figure 25C:
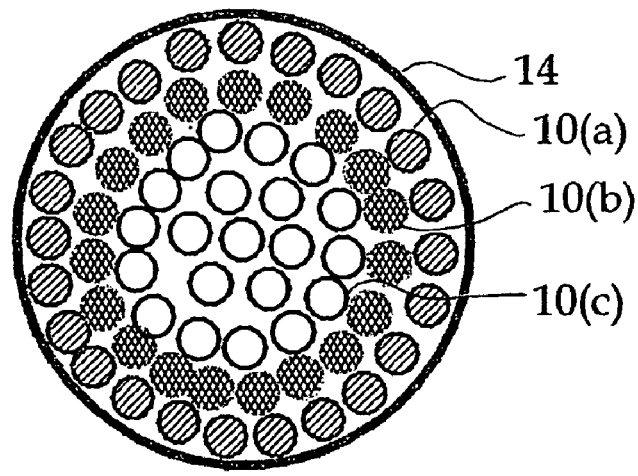
Figure 25D:
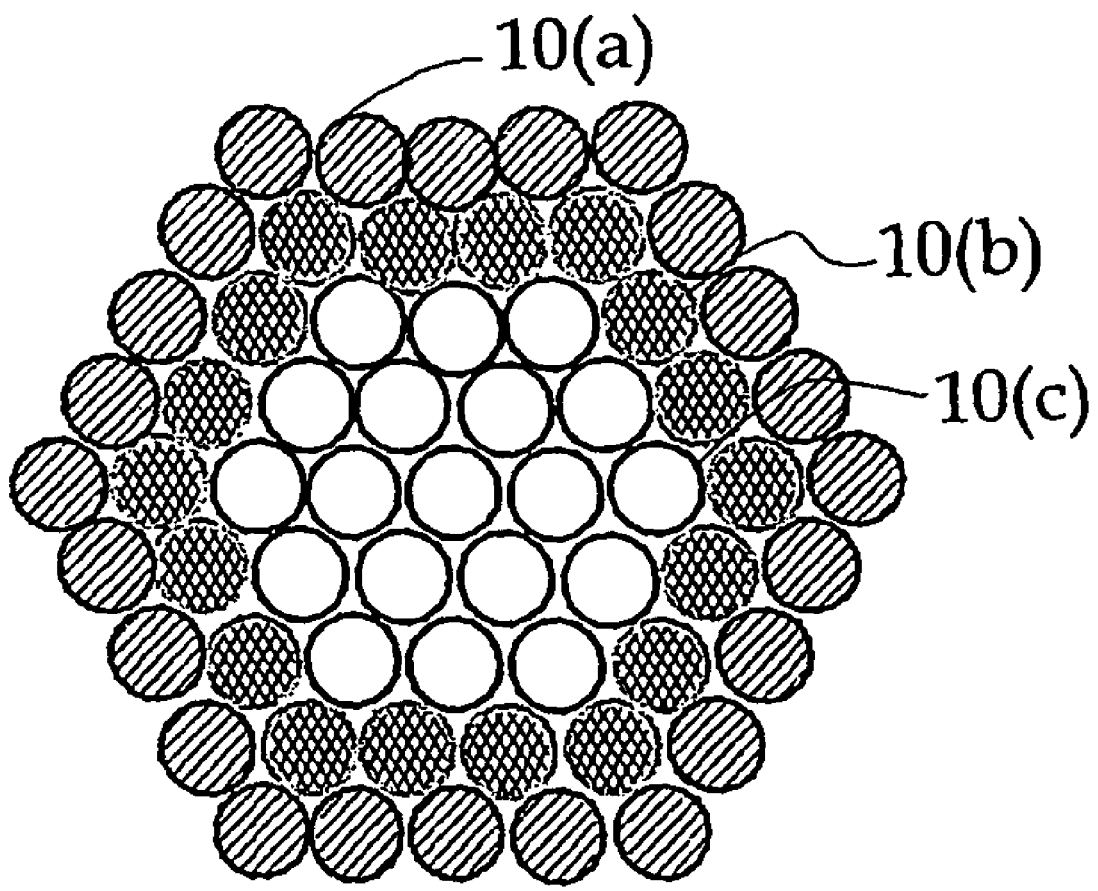

According to another embodiment of the invention, and referring to FIGS. 25(a) to (d), the electrolyte combinations in the above table can also be applied to fuel cell stacks not having concentrically arranged fuel cells. For example, in FIGS. 25(a) to (c), a stack 1 having a single larger outer tubular solid oxide fuel cell 14 surrounds a plurality of smaller inner tubular fuel cells 10 arranged side by side in a spaced cluster. In FIG. 25(a), the outer fuel cell 14 has a $CeO_2$ based or SSZ electrolyte, and the inner fuel cells 10 all have YSZ electrolytes. In FIG. 25 (b), the outer fuel cell 14 and the outermost ring of inner fuel cells 10(a) have a $CeO_2$ based or SSZ electrolyte, and the remaining inner fuel cells 10(b) have a YSZ electrolyte. In FIG. 25(c), the outer fuel cell 14 and outermost ring of inner fuel cells 10(a) have a $CeO_2$ based electrolyte, the second outermost ring of Inner fuel cells 10(b) have a SSZ electrolyte, and the remaining inner fuel cells 10(c) have a YSZ electrolyte. In FIG. 25(d) the fuel cells 10 are arranged in a hexagonal array in which the outermost ring of fuel cells 10(a) have $CeO_2$ based electrolyte, the second outermost ring of fuel cells 10(b) have a SSZ electrolyte, and the remaining fuel cells 10(c) have an YSZ electrolyte. Other fuel cell stack configurations are also contemplated, such as rectangular, wherein the electrolyte material for a particular fuel cell is selected based on the operating temperature of said fuel cell.

Referring again to FIGS. 1(a) and (b), the fuel cells 10, 12, 14 are arranged concentrically and the middle fuel cell 12 is joined to the inner fuel cell 10 at its top end by a first annular top end cap 16 and at its bottom end by an annular bottom end cap 18; the opening in the end caps 16, 18 are dimensioned to snugly fit around the periphery of the inner fuel cell 10. The middle fuel cell 12 is joined to the outer fuel cell 16 by a second annular top end cap 19; the opening in the top end cap 19 is dimensioned to snugly fit around the periphery of the middle fuel cell 12. The outer tube 14 may be formed with a closed bottom end 21, or with an open bottom end that is closed with a gas-tight bottom end cap 21. Top and bottom end caps 16, 18, 19, 21 all are connected to respective fuel cells 10, 12, 14 to form a gas-tight seal.

Instead of separate first and second top end caps 16, 19, a single annular top end cap (not shown) may be used to cap the top of the second and outer fuel cells 12, 14.

An oxidant supply conduit 20 is provided that extends from outside the fuel cell stack 1, through the first annular top end cap 16, into the annular space between the walls of the inner and middle fuel cells 10, 12 ("oxidant chamber"), and terminates near the bottom end cap 18. The oxidant chamber can be filled with a porous metal foam matrix material as described in Applicant's application PCT/CA03/00216 to enhance current collection and provide additional structural support to the stack 1. An oxidant exhaust outlet 22 extends from the oxidant chamber near the top end cap 16, and through the first annular top end cap 16. Also, a fuel exhaust outlet 24 extends from the space defined by the walls of the middle and outer fuel cells 12, 14, and the bottom and top end caps 19, 21 ("fuel chamber"), through the second annular top end cap 19, and out of the fuel cell stack 1. The fuel chamber can also be filled with a porous metal foam matrix material to enhance current collection and provide additional structural support to the stack.

With the construction as described above, flow paths for fuel gas and oxidant gas are defined for the fuel cell stack 1. In particular, a fuel flow path begins at the top opening of the inner fuel cell 10 ("fuel supply inlet"), through the inside of the inner fuel cell 10, through the bottom opening of the inner fuel cell 10, and into the bottom of the fuel chamber, and finally, out of the stack 1 through the fuel exhaust outlet 24 at the top of the fuel chamber. This fuel flow path is designed to provide a long fuel path i.e., higher residence time for the fuel in the stack 1. This is expected to improve fuel conversion i.e., more fuel utilization. An oxidant flow path begins at the outside end of the oxidant supply conduit 20 ("oxidant supply inlet"), out the other end of the oxidant supply conduit 20 and into the bottom of the oxidant chamber, and upwards and out of the stack 1 via the oxidant exhaust outlet 22. The stack 1 may also be immersed in oxidant (e.g. air) so that the outer surface of the outer fuel cell 16 is exposed to oxidant.

To avoid leakage of one gas flowpath into the other, the connections establish gas-tight seals, e.g. between the end caps 16, 18, 19, 21 and connected fuel cells 10, 12, 16.

By electrically connecting the fuel cells 10, 12, 14 in the manner as known in the art (either in parallel or in series), and flowing fuel and oxidant through their respective flow paths, the stack 1 generates electricity by electrochemical reactions as known in the solid-oxide fuel cell art. The surfaces exposed to the flow of fuel are anodic, and may include catalytic material to promote the electrochemical reaction. The surfaces exposed to the flow of oxidant are cathodic.

The packaging of the fuel cells 10, 12, 14 provides a compact stack design that provides a higher energy production density than three similarly sized fuel cells arranged side-by-side, which would produce about the same power output but occupy more volume, and a single fuel cell which occupies the same volume but produces less power output. For example, for a fuel cell stack 1 with the outer fuel cell 14 having a diameter of 8 mm, the middle fuel cell 12 having a diameter of 4 mm and inner fuel cell 10 having a diameter of 2 mm, and all fuel cells 10, 12, 14 having a length of 5 cm and producing 0.25 W per $cm^2$, the stack 1 is expected to produce ~5.5 W of power, and a corresponding energy density of ~2 $W/cm^3$. In comparison, a single tubular fuel cell of diameter 8 mm and 5 cm length and producing 0.25 W per $cm^2$, will produce ~3.2 W of power. Therefore, three fuel cell stack 1 produces nearly 70% more power while occupying the same volume as the single fuel cell.

With an outside diameter of between 4-10 mm and a power output of up to 10 W, the fuel cell stack 1 is expected to be suitable for use in small-size power applications, such as portable electronic devices. However, the improved power density provided by the compact packaging in the fuel cell stack 1 is expected to be also appreciated in larger-sized applications.

An air diffuser 26 is provided at the bottom of the annular space between the inner and middle tubes 10, 12 to distribute oxidant uniformly through this space. The diffuser 26 may be made of porous ceramics, cermet or metal.

Figure 2:
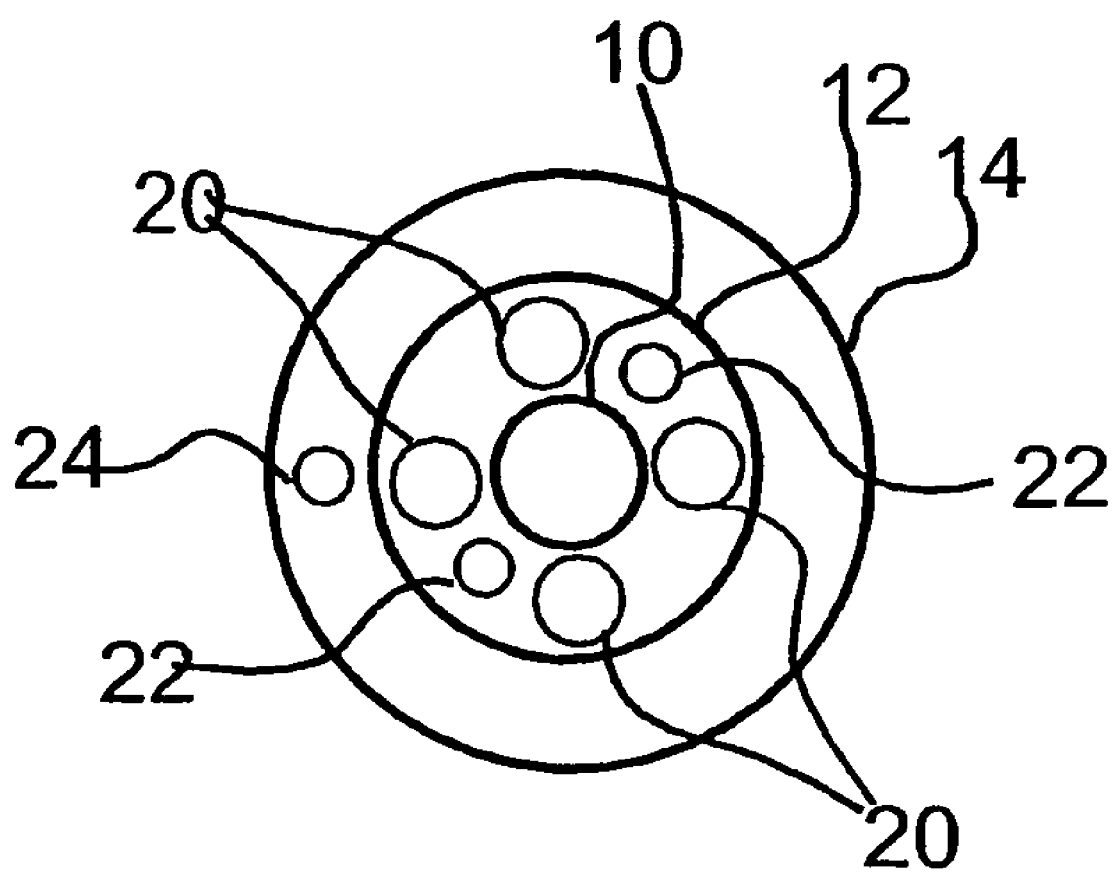
FIG. 2 is a schematic top view of a tubular fuel cell stack comprising multiple concentric tubular fuel cells and a plurality of oxidant inlets and oxidant outlets.

Referring to FIG. 2 and according to another embodiment of the invention, the fuel cell stack 1 as shown in FIG. 1 is modified to include multiple oxidant supply conduits 20. As shown in FIG. 2, four oxidant supply conduits 20 serve to feed oxidant into the stack 1, and a pair of oxidant exhaust conduit 22 serve to exhaust oxidant out of the stack 1. While four oxidant supply conduits 20 are shown in FIG. 2, more supply conduits 20 may be added to increase the diffusion and uniform distribution of oxidant through the stack 1. The diffuser 26 may be omitted when a sufficient number of oxidant supply conduits 20 are provided to provide comparable oxidant diffusion and uniformity.

Figure 3:
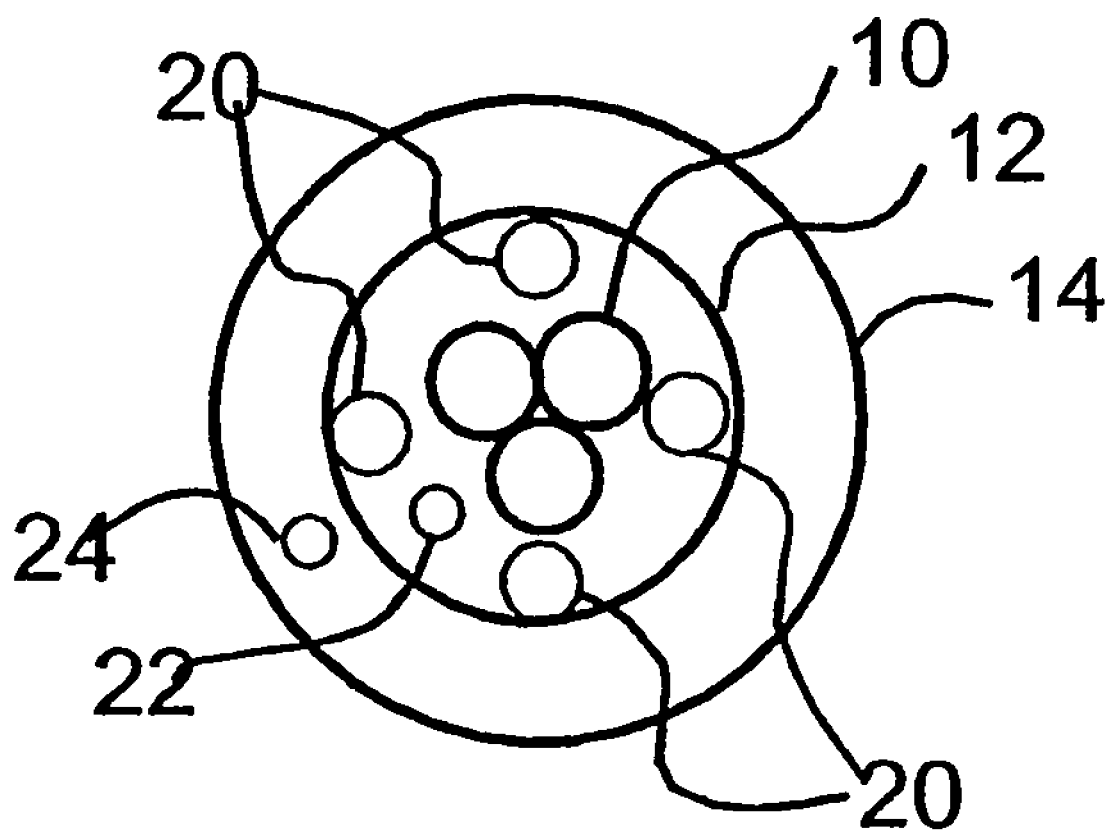
FIG. 3 is a schematic top view of a tubular fuel cell stack comprising a plurality of inner tubular fuel cells surrounded by concentric middle and outer tubular fuel cells.

Referring to FIG. 3 and according to another embodiment of the invention, the fuel cell stack 1 as shown in FIG. 1 is modified to provide three inner fuel cells 10 arranged in a close-packed cluster. To fit within the middle fuel cell 12, the diameters of the inner fuel cells 10 are reduced so that the perimeter of the cluster is about the circumference of the inner fuel cell 10 shown in FIG. 1. The cluster of inner fuel cells 10 provides a greater reactive surface area compared to the single inner fuel cell 10 shown in FIG. 1, and as a result, the fuel cell stack 1 of this embodiment is expected to provide a higher power output than the fuel cell stack 1 as shown in FIG. 1, when both stacks have similar exterior dimensions. Alternatively, a different number of inner fuel cell tubes 10 can be provided.

Figure 4A:
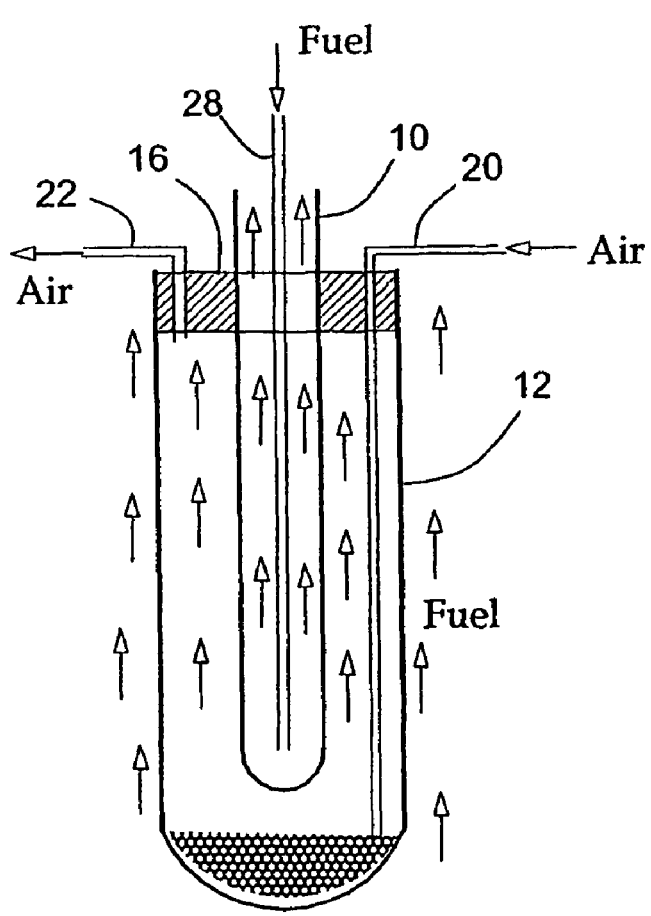
FIGS. 4(a) and (b) are schematic sectioned side views of solid oxide fuel cell stacks each comprising two concentric tubular fuel cells.
Figure 4B:
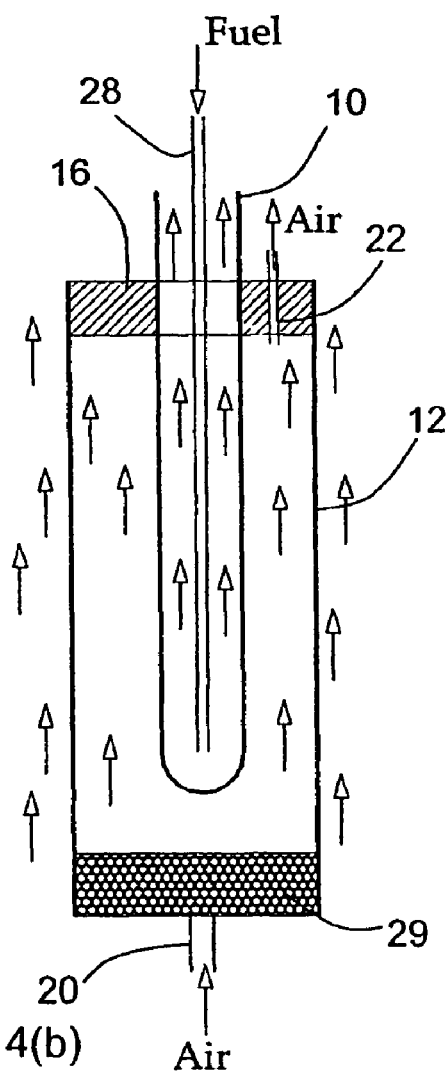

Referring to FIGS. 4(*a*) and (*b*) and according to another embodiment of the invention, a two fuel cell stack 1 can be provided that enjoys the packaging and performance advantages of the three cell design shown in FIGS. 1 to 3. Apart from having one less fuel cell 14, the design of the two cell stack is essentially the same as the three cell stack design. The inner and outer fuel cells 10, 12 can be single ended as shown in FIG. 4(*a*), in which case, the air supply conduit 20 and air discharge conduit 22 are located in the top end cap 16, and a fuel supply conduit 28 is provided that extends into inner fuel cell 10 and discharges fuel at the bottom of the inner fuel cell 10. Fuel flows upwards and is reacted; unused fuel is discharged from the stack 1 through the top opening of the inner fuel cell 10. Fuel is also supplied over the outside surface of the outer fuel cell 12.

In another configuration, the inner fuel cell 12 can be single ended and the outer fuel cell double ended as shown in FIG. 4(*b*). In such case, the air supply conduit 20 flows air through a bottom end cap 29 fixed to the bottom end of the outer fuel cell 12. Alternatively but not shown, the inner fuel cell 10 can be open ended and extend through both the top and bottom end caps 16, 29 of the outer fuel cell 12.

Like the three cell stack 1, the two cell stack 1 will also experience a temperature gradient wherein the core of the stack 1 will be warmer than the periphery. Therefore, the inner fuel cell 10 can have an electrolyte layer made of a material that is particularly suitable for the operating temperature in the core of the stack 1, e.g. YSZ, and the outer fuel cell can have an electrolyte layer having a material that operates optimally at a lower temperature, e.g. $CeO_2$ or SSZ.

Multiple fuel cell stacks based on the embodiments described above and shown in FIGS. 1-4 may be assembled together to form a super-stack (not shown) to provide a greater power output than a single stack 1.

Referring to FIGS. 5 to 8 and according to another embodiment of the invention, a super-stack 30 can be formed of tubular SOFC fuel cells 32 assembled in rows and interspersed by support plates 34. Each fuel cell 32 can be a single fuel cell as described in Applicant's PCT application PCT/CA01/00634 or PCT/CA03/00059, or the fuel cell stack 1 as shown in FIGS. 1-4, and FIGS. 22-25, which in this case can be considered a "sub-stack" of the super-stack 30. The support plates 34 include a metal base plate 38 that is coated with an oxidant-resistant coating 40 and a cathode coating 36. The oxidation-resistant coating 40 and cathode coating 36 are optional; when the metal base plate 38 is oxidation-resistant then the oxidation-resistant coating 40 is not required, and when each single cell has a sufficient cathode coating then the cathode coating 36 is not required. The metal plates 34 can be made of a metal suitable for high temperature SOFC operation such as Inconel, ferretic steel, and stainless steel and serve as a support structure for the fuel cells 32, as well as a current collector. The oxidant resistant coating 40 can be for example, silver, gold, platinum, palladium, silver and Inconel alloy, silver and hastelloy, or an iron chromium alloy. The oxidant-resistant coating 40 serves to protect the base plate 38 from the high temperatures typically encountered during SOFC operation.

The metal plates can be substantially planar as shown in FIGS. 5, 7-8, or be corrugated as shown in FIG. 6 to improve the support of each fuel cell 32. By establishing an electrical connection between the cathode layer 36 of the plate 34 and the cathode layers of the fuel cells 32, electrical wiring (not shown) of the super-stack 30 can be simplified, by connecting wiring to the plates 34 instead of the cathode portion of each fuel cell 32.

Optionally, the support plate 34 is perforated to improve oxidant distribution within the super-stack 30. Also optionally, electrically isolated sub-stacks can be created by separating one group (sub-stack) of fuel cells 32 and/or support plates 34 from another group with an electrically resistive thin ceramic plate (not shown). This ceramic plate can optionally be perforated to promote oxidant distribution.

Figure 9:
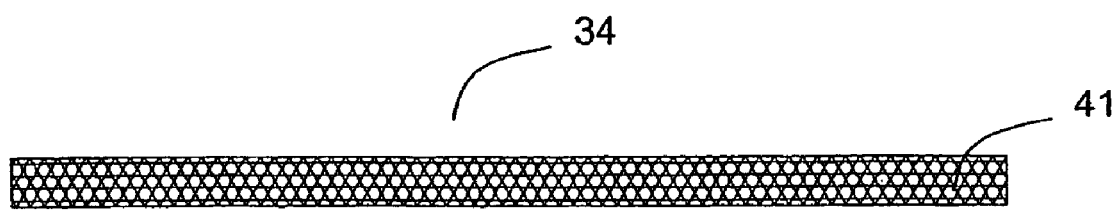
FIG. 9 is a schematic side view of a foam matrix support sheet.
Figure 10:
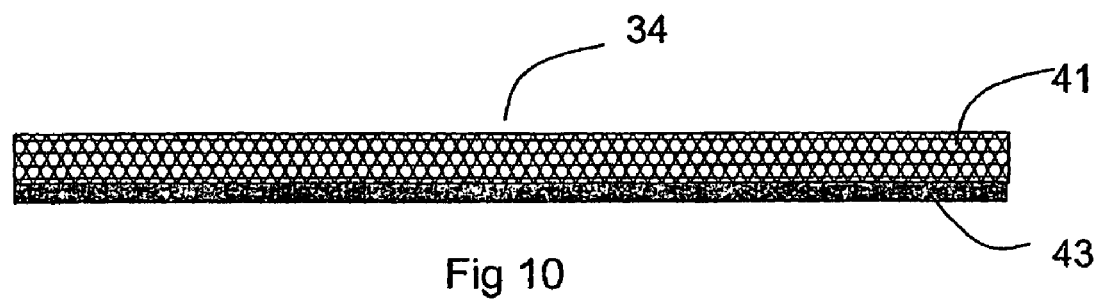
FIG. 10 is a schematic side view of a foam matrix support sheet with a planar metal backing sheet.
Figure 22:
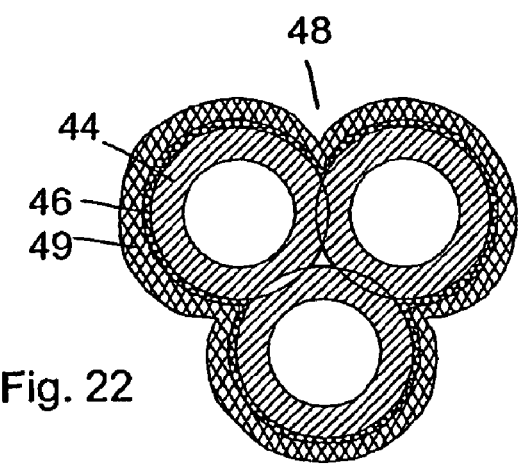
FIG. 22 is a schematic top view of an alternative configuration of a solid oxide fuel cell made by the method shown in FIGS. 11 to 13.
Figure 23:
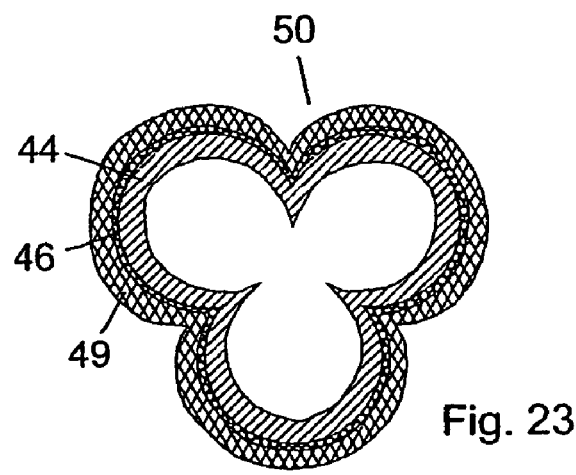
FIG. 23 is a schematic top view of an alternative configuration of a solid oxide fuel cell made by the method shown in FIGS. 14 to 17.
Figure 24:
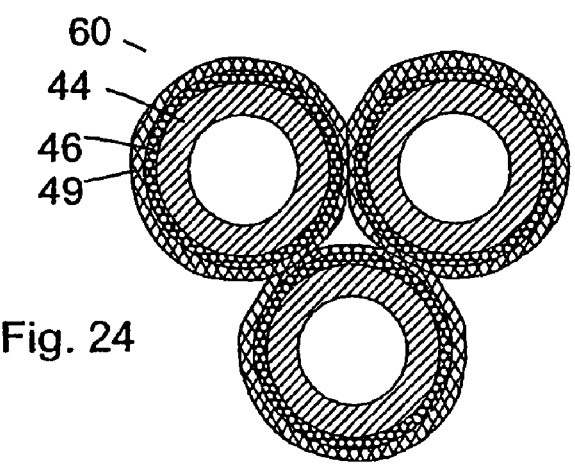
FIG. 24 is a schematic top view of an alternative configuration of a solid oxide fuel stack made by the method shown in FIGS. 18 to 21.

Referring to FIGS. 9 and 10, and according to another embodiment of the invention, the support plate 34 can be a metal foam matrix sheet 41 made by the method taught in Applicant's PCT application no. PCT/CA03/00216. This foam matrix sheet 41 can be coated with one or both of an optional oxidation-resistant coating, a cathode coating and/or a catalyst coating (none shown). The metal foam sheet 41 can be attached to an adjacent thin metal backing sheet 43 to provide structural support. This backing sheet 43 can optionally be perforated. The foam matrix sheet 41 with or without a backing sheet is particularly desirable for use in the super-stack 30 as it is relatively light, has good oxidant porosity, and provides good mechanical shock and abuse resistance.

Referring now to FIGS. 11 to 13 and according to another embodiment of the invention, a fuel cell 48 having multiple reactant chambers is produced by a method that uses EPD, MED or CED. Referring particularly to FIGS. 11(*a*) and 11(*b*), electrically conductive longitudinally-extending combustible cores 42 are arranged side-by-side in a closely spaced pattern; the spacing is selected based on the wall thickness desired in the resulting fuel cell 48. While the cores 42 are shown in a single row in FIGS. 11 to 13, it is within the scope of the invention to arrange the cores in different patterns, and to use a different number of cores of the same or varying lengths; also a "side-by-side" arrangement includes cores 42 arranged such that their lengths fully or partially overlap. The cores 42 can be made of graphite, or any other conducting electrode that will combust during heat treatment. Then, as shown in FIGS. 12(*a*) and 12(*b*), electrode material is electrophoretically deposited on the cores 42 to form an inner electrode layer 44 which shape is defined by the geometric arrangement of the cores 42. After the inner electrode layer 44 has been deposited and referring to FIGS. 13(*a*) and 13(*b*), electrolyte material is deposited on the electrode to form an electrolyte layer 46 which shape conforms to the geometry of the inner electrode layer 44. Then, a sintering heat treatment may be applied such that the cores 42 combust, leaving behind the inner electrode and electrolyte layers 44, 46; the spaces previously occupied by the cores 42 will be used as inner reactant chambers in which a reactant (fuel or oxidant) flows therethrough for electrochemical reaction. The fuel cell 48 may be completed by applying an outer electrode layer (not shown) by known methods, such as dip-coating, or brush painting. The outer electrode layer can also be applied by EPD, in which case, before sintering, the outer electrode layer is applied to the electrolyte layer 36 by EPD.

By arranging the cores 42 in the manner shown in FIGS. 11 to 13, a single fuel cell 48 having multiple first reactant chambers is provided; such multiple reactant flow paths provide a greater reactive surface area than a single reactant flow path, and as a result, contribute to an increased power output in the fuel cell 48. Optionally, the cores 42 can be arranged in different patterns to produce a fuel cell 48 having different configurations, such as the triangle pattern shown in FIG. 22.

Referring to FIGS. 14 to 17 and according to another embodiment of the invention, a fuel cell 50 having a single transversely elongated reactant chamber is produced by a method that uses EPD, MED or CED. The method is the same as the method shown in FIGS. 11 to 13, except that the combustible cores 42 are arranged in a row in contact with each other (FIGS. 14(*a*) and 14(*b*)). When the inner electrode layer 44 is deposited on the cores 42, no electrode material is deposited between the cores 42 (FIGS. 15(*a*) and 15(*b*)). Therefore, after the electrolyte layer 46 has been deposited (FIGS. 16(*a*) and 16(*b*)), the two layers 44, 46 have been sintered and the cores 42 combusted, a single transversely-extending inner reactant chamber 200 is formed (FIG. 17). The undulating shape of the inner reactant chamber is particularly advantageous as the shape provides an increased reaction surface area compared to a cylindrically-shaped inner reactant chamber. Optionally, the cores 42 can be arranged in different patterns to produce a fuel cell 50 having different configurations, such as the triangle pattern shown in FIG. 23.

Referring to FIGS. 18 to 21 and according to another embodiment of the invention, a fuel cell stack 60 having a plurality of tubular fuel cells with physically coupled cathode layers 49 is produced by a method that uses EPD, MED or CED. This method is the same as shown in FIGS. 11 to 13 except that the combustible cores 42 are arranged in a spaced pattern with enough space in between cores that separate inner electrode layers 44 and electrolyte layers 46 can be formed around each combustible core 42; since there are separate electrolyte layers 46, this structure is characterized as a stack of separate fuel cells instead of a single fuel cell. After the inner electrode and electrolyte layers 44, 46 have been applied, an outer electrode layer 49 is applied, e.g. by EPD onto the electrolyte layers 46; the spacing between cores 42 and the amount of outer electrode material that is deposited are selected so that the outer electrode layers 49 are in physical contact with each other. Upon sintering, the combustible cores combust, leaving behind a stack 10 having multiple fuel cells with physically coupled cathode layers 49. Optionally, the cores 42 can be arranged in different patterns to produce a fuel cell stack 60 having different configurations, such as the triangle pattern shown in FIG. 24.

During initial deposition, each core 42 can have considerable separation; when each element (e.g. electrode or electrolyte layers) needs to touch another same element, the cores can be moved to a position where they will touch each other or they are now so close that little additional deposited material will cause them to contact each other. This moving step can be done inside the EPD suspension (where samples are fully or partially immersed in an EPD bath or can be done outside the suspension but in such case, the method has to be completed before fuel cell materials have completely dried). After the cores have been moved, additional inner electrode material can be deposited onto the cores before the electrolyte material is deposited.

While the present invention has been described herein by the preferred embodiments, it will be understood to those skilled in the art that various changes may be made and added to the invention. The changes and alternatives are considered within the spirit and scope of the present invention.

What is claimed is:

1. A method of manufacturing a solid oxide fuel cell comprising:
    a) arranging a plurality of longitudinally-extending combustible cores side-by-side in a transversely spaced cluster;
    b) using one of electrophoretic deposition, metal electrodeposition and composite electrodeposition to deposit enough inner electrode material onto the cores that the outer periphery of the cluster is covered with the electrode material thereby forming a continuous inner electrode layer around the cluster and the spaces in between the cores are filled with the electrode material;
    c) depositing electrolyte material onto the inner electrode layer to form an electrolyte layer;
    d) sintering the layers such that the combustible cores combust and a reactant channel is formed inside the inner electrode layer from each combusted core; and
    e) applying an outer electrode layer onto the electrolyte layer.

2. The method of claim 1 wherein the cores are arranged side-by-side in a single row.

3. The method of claim 1 wherein the outer electrode layer is deposited by electophoretic deposition, and before the sintering step.

4. A method of manufacturing a solid oxide fuel cell stack comprising
    a) arranging a plurality of longitudinally-extending combustible cores side-by-side in a transversely spaced cluster;
    b) forming a plurality of fuel cells by one of electrophoretically depositing, metal electrodepositing and composite electrodepositing inner electrode material onto each core to form an inner electrode layer, then depositing an electrolyte material onto each core to form an electrolyte layer, and applying sufficient outer electrode material onto each electrolyte layer that the outer electrode layer of each fuel cell is physically coupled to an electrode layer of an adjacent fuel cell,
    c) sintering the layers such that the combustible cores combust, thereby forming an inner reactant channel for each fuel cell.

5. The method of claim 4 wherein the sintering step occurs after the electrolyte layer is deposited and before the outer electrode material is applied.

6. The method of claim 5 wherein the outer electrode layer is applied by one of dip-coating and brush-painting.

7. The method of claim 4 wherein the outer electrode material is applied onto the electrolyte layers by electrophoretic deposition, and the sintering step occurs after the outer electrode material is applied.

8. The method of claim 4 wherein after the inner electrode material and electrolyte material has been deposited, the cores are moved closer together before the outer electrode material is applied onto the electrolyte layers.

* * * * *